(No Model.)

F. H. RICHARDS.
WEIGHING MACHINE.

No. 585,976.  Patented July 6, 1897.

Witnesses:
O. W. Smith
Fred. J. Dole.

Inventor:
F. H. Richards.

(No Model.)

F. H. RICHARDS.
WEIGHING MACHINE.

No. 585,976.  Patented July 6, 1897.

Witnesses:
O. W. Smith
Fred. J. Dole.

Inventor:
F. H. Richards.

(No Model.)

F. H. RICHARDS.
WEIGHING MACHINE.

Patented July 6, 1897.

Witnesses:
C. W. Smith
Fred. J. Dole.

Inventor,
F. H. Richards.

(No Model.)  F. H. RICHARDS.  5 Sheets—Sheet 4.
WEIGHING MACHINE.

No. 585,976.  Patented July 6, 1897.

Fig. 4.

Witnesses:
C. W. Smith
Fred. J. Dole

Inventor:
F. H. Richards (No Model.) 5 Sheets—Sheet 5.

F. H. RICHARDS.
WEIGHING MACHINE.

No. 585,976. Patented July 6, 1897.

Witnesses:
O. W. Smith
Fred. J. Dole.

Inventor:
F. H. Richards.

UNITED STATES PATENT OFFICE.

FRANCIS H. RICHARDS, OF HARTFORD, CONNECTICUT.

WEIGHING-MACHINE.

SPECIFICATION forming part of Letters Patent No. 585,976, dated July 6, 1897.

Application filed November 18, 1896. Serial No. 612,563. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for automatically weighing and delivering various kinds of materials, which, as to certain of its features, is an improvement upon the machine set forth in a concurrently-pending application, Serial No. 612,016, filed November 13, 1896.

One of the objects of the invention is to provide improved stream-supply means which comprehend instrumentalities for delivering to the load-receiver or bucket of the machine streams of different volumes and an extensible and flexible valve for controlling the supply, such valve being adapted in the present case to arrest the passage of the drip-stream, which is the smaller of the two, and prevent the same from entering the bucket at the close of the weighing operation.

In the form of the invention herein illustrated the means for supplying the bucket includes a feed-conveyer, and it is therefore a further object of the invention to provide simple and efficient driving mechanism for effecting a variable speed of the feed-conveyer, to obtain the necessary variance in quantity of the supply, and to also stop the feed-conveyer on the completion of the load, the feed-conveyer driving and controlling mechanism being coöperative with the weighing mechanism.

Another object of the invention is to provide, in conjunction with a bucket and its closer, a wiper or scraper which is carried by one of said parts and which is preferably operable for removing any adhering particles from the bucket, such organization being particularly advantageous when the machine is weighing materials of a finely-pulverulent character and which tend to cake at the outlet of the bucket.

In the drawings accompanying and forming part of this specification.

Similar characters designate like parts in all the figures of the drawings.

The framework for carrying the various parts of the machine or apparatus may be of any suitable nature, and it consists of the hollow base 2 and the end frames or columns 3 and 4, which rise therefrom and which constitute a main frame, such main frame supporting an auxiliary frame consisting of the approximately right-angled brackets 5 and 6, mounted on the main frames 3 and 4 and attached thereto in some convenient manner.

A pair of risers 7 and 8, which extend upward from the base 2, are joined to the parallel arms of the brackets 5 and 6, such brackets or standards serving as a part of the auxiliary frame and being adapted to support the supply apparatus, which, as before stated, includes a feed-conveyer.

The weighing mechanism comprises a bucket and supporting-beam mechanism therefor, such members being substantially similar in construction and mode of operation to that set forth in Letters Patent No. 548,840, granted to me October 29, 1895, to which reference may be had, although it is clearly evident that other types of weighing mechanism can be employed.

The bucket is designated by G, and it is suspended upon the poising sides of the scale-beams B and B' in the manner set forth in my said patent, such beams being pivotally mounted upon the base 2, and each consisting of a pair of parallel arms joined at the outer extremities by the counterweights W and W', respectively.

The closer for the bucket and which controls the discharge-outlet thereof is designated in a general way by L, and it consists of a substantially flat plate or closer proper, 20, which is adjacent to the lower edge of the bucket when shut, said closer having projecting trunnions 21 and 22, which are journaled in the obliquely-disposed hangers or brackets 23 and 24, respectively, which are attached to the opposite end walls of the bucket, said last-mentioned parts constituting a convenient means for shiftably connecting the closer to the bucket. The closer L will be counterweighted, as is customary, the office of the counterweight or counterweights being to return it to its normal or shut position on the discharge of a bucket load.

The closer-holding means in the present case embody an inverted toggle and a latch or equivalent detent device, which is located to engage one of the toggle members to thereby hold the closer shut. (See Figs. 5 and 6.)

The bucket G, near the upper rearward side thereof, is furnished with suitable brackets, in which the shaft 9 is mounted, the rocker 10 being affixed to said shaft and having a rod 12 connected thereto and also to the closer in such a manner that the three pivots will be virtually in alinement when the closer is shut, so that the latter may be held against opening movement by a minimum expenditure of power. The latch to which I have just alluded is designated by 13, it being counterweighted and pivotally connected to the bucket and swinging upward to engage the coöperating arm 14 of the rocker 10. The shaft 9 is furnished with a crank-arm 15, which is pivotally jointed to the rod 16, said rod being similarly attached to the closer, and it moves in parallelism with the companion rod 12 on the reciprocations of said closer.

In connection with the bucket and with the closer, which is shiftably connected thereto, I employ a wiper or scraper which is preferably operable on its intermittent movement to remove from the bucket any particles or lumps of material which would otherwise adhere thereto and ultimately seriously interfere with the successful operation of the machine. This wiper I prefer to support upon the closer, it being in the form of a roll 25, the face of which is plain, the shaft 25' of said roll being rotatively supported by ears or lugs at the opposite sides of the closer. The roll 25 also constitutes an intermittently-active discharge edge for the closer, it practically forming a continuation of the plate 20, so that when it is rotated it may clear itself of all particles of material as well as the adjacent bucket.

The bucket G has at its rearward side the depending lip or guard 26, against the inner face of which the periphery of the wiper-roll 25 is contiguous when the closer is shut, so that a tight closure is provided at this point and the escape of the finely-pulverized particles of material between the closer and the bucket is thereby prevented, and by reason of the rotation of the discharge edge of the closer or the wiper-roll 25 the material cannot block the complete shutting of the same.

I prefer to impart the necessary step-by-step or intermittent rotative movement to the wiper-roll 25 on the shutting of the closer, whereby as said roll travels along the coöperating face of a depending lip or guard 26 it will dislodge any material which tends to cake thereon.

For transmitting the requisite intermittent rotative movement to the wiping-roll 25 as the closer L shuts I may, as represented in the drawings, employ a pawl-and-ratchet mechanism.

The ratchet is designated by 27, and it is rigidly connected to the shaft 25' on the wiping-roll, the operating-pawl being designated by 28, and it being loosely movable about the pivot 29, which joins the rod 30 to the link 31, said link being also loosely connected to the shaft 25', the rod or link 30 being connected to the fixed arm or extension 32 of the closer-support 23, which serves as a convenient resistance member for insuring the necessary amount of rotative movement of the wiping-roll 25, as will now appear.

Figures 2, 7:
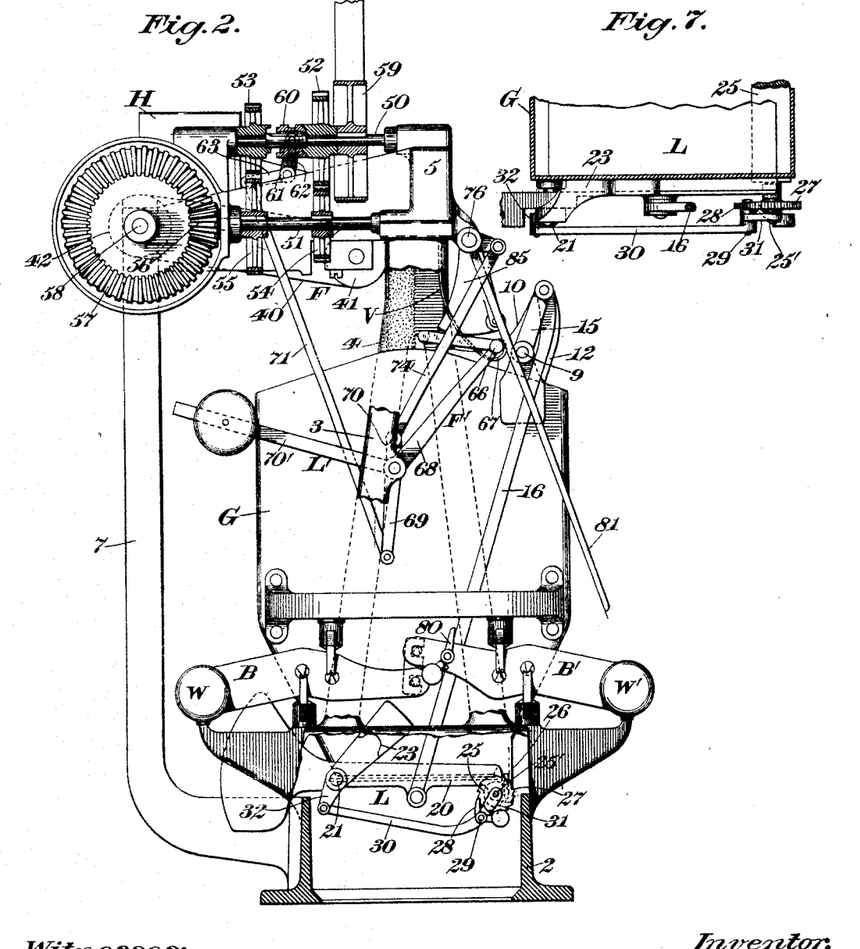
Fig. 2 is an end elevation as seen from the right in Fig. 1, a portion of the framing being removed and the feed-conveyer-driving mechanism being in central vertical section.
Figs. 7 and 8 are detail views of the bucket and closer mechanism.

The actuating-pawl 28 is preferably counterweighted, whereby the point thereof will be kept in engagement with the teeth of the ratchet. Fig. 2 represents the closer L shut. Let it be assumed that the detent or latch 13 has been tripped, thereby releasing the closer. This being the case, the closer will be forced open by the weight of the contents within the bucket, so that the link 31 and the rod 30 will be swung therewith and the joint between said parts broken, whereby the counterweighted pawl 28 will be caused to run idly over the teeth of the ratchet. On the return stroke of the closer this action will be exactly reversed, so that the pawl will rotate the roll, and as the latter comes in contact with the depending lip or guard 26 of the bucket all particles of material will be cleaned or wiped therefrom.

The supply means for delivering material to the bucket to be weighed includes a suitable feed-conveyer, that employed being designated in a general way by F, and it consists of an endless belt or band 40, of suitable material, passed around the supporting-rolls 41 and 42, the shafts of which are carried by the auxiliary frame, to which I have hereinbefore alluded, one of which shafts is preferably journaled in adjustable blocks, whereby the tension of the belt may be properly regulated.

The feed-conveyer or feeder F will preferably have differential speeds, whereby it is capable of conducting to the bucket two streams of material, the first being a relatively large stream, while the second is much reduced or attenuated, and the last-mentioned stream constitutes the drip which is provided to complete with accuracy the partial load previously furnished by the main or larger stream.

For effecting the necessary variation in velocity of the feed-conveyer F at proper points in the weighing operation I employ two loose power-transmitting members of different sizes, which may be successively coupled to their supporting-shaft and which may transmit through proper intermediate connections the driving force to the feed-conveyer.

For obtaining the necessary variation in speed of the feed-conveyer the driving mechanism therefor will include, as hereinbefore stated, two loose power-transmitting members; and these consist in the present case of differential gears, which mesh with similar gears, the last-mentioned being connected by gearing or otherwise to the feed-conveyer F.

A shaft is represented at 50, it carrying the differential driving-gears to which I have just referred, the companion shaft 51 being parallel thereto and both shafts being suitably sustained by the framing of the machine.

The two gears carried by the shaft 50 are designated by 52 and 53, the first-mentioned being relatively larger than the other. The large gear 52 meshes with the smaller gear 54 upon the shaft 51, while the small gear 53 meshes with the large gear 55 upon said shaft 51, the two gears 54 and 55 being keyed or otherwise secured to their supporting-shaft 51. The shaft 51 will be also furnished at one end with a bevel-gear 56, of comparatively small size, which meshes with the large bevel-gear 57 on the shaft 58 of the feed-conveyer, and said bevel-gears may be boxed or housed, as shown.

The gears 52 and 53 will be alternately thrown into operative connection with their shaft 50; and it will be understood that when the gear 52 is coupled to said shaft the feed-conveyer F will be operated at a relatively rapid rate of speed, and that when the small gear 53 is coupled to said shaft said feed-conveyer will be driven at a reduced rate of speed.

A supply chute or hopper is shown at H, it being located over the upper run of the feed-conveyer F and mounted upon the framing of the machine. The supply hopper or chute is adapted to contain a mass of material, which gravitates therefrom to the feed-conveyer F, and when said feed-conveyer is being run at its higher rate of speed it will convey a large stream of material to the bucket G to form the major part of a load to be weighed.

When the speed of the feed-conveyer is reduced, it will deliver to the bucket a reduced or drip stream for finishing the load.

The main shaft 50 is provided with the driver or pulley 59, which may be connected by belting or otherwise to a motor (not shown) to furnish the necessary power to actuate the feed-conveyer.

To successively throw the two gears 52 and 53 into operative connection with their supporting-shaft 50, I prefer to employ a coupler or coupling device, such as that illustrated, which consists of a collar 60, longitudinally slidable on said shaft, and which is keyed thereto, said coupling device 60 having projections extending from its opposite faces which are adapted to enter coöperating notches in the adjacent hubs of the two gears. The coupling device 60 will have three distinct or separate shifts, on the first mentioned of which it is capable of engaging the gear 52, it being operable on the second shift to engage the gear 53, and on the third to be thrown into an idle or ineffective position, whereby the feed-conveyer F will be stopped, this action taking place at the close of the weighing operation or the completion of a load.

The action of the coupling device 60, which is disposed intermediate the two gears 52 and 53, will be governed or controlled by means operative with the weighing mechanism, whereby the requisite change in velocity and ultimate stoppage of the feed-conveyer may be accurately obtained at predetermined points in the operation of the machine.

Figure 1:
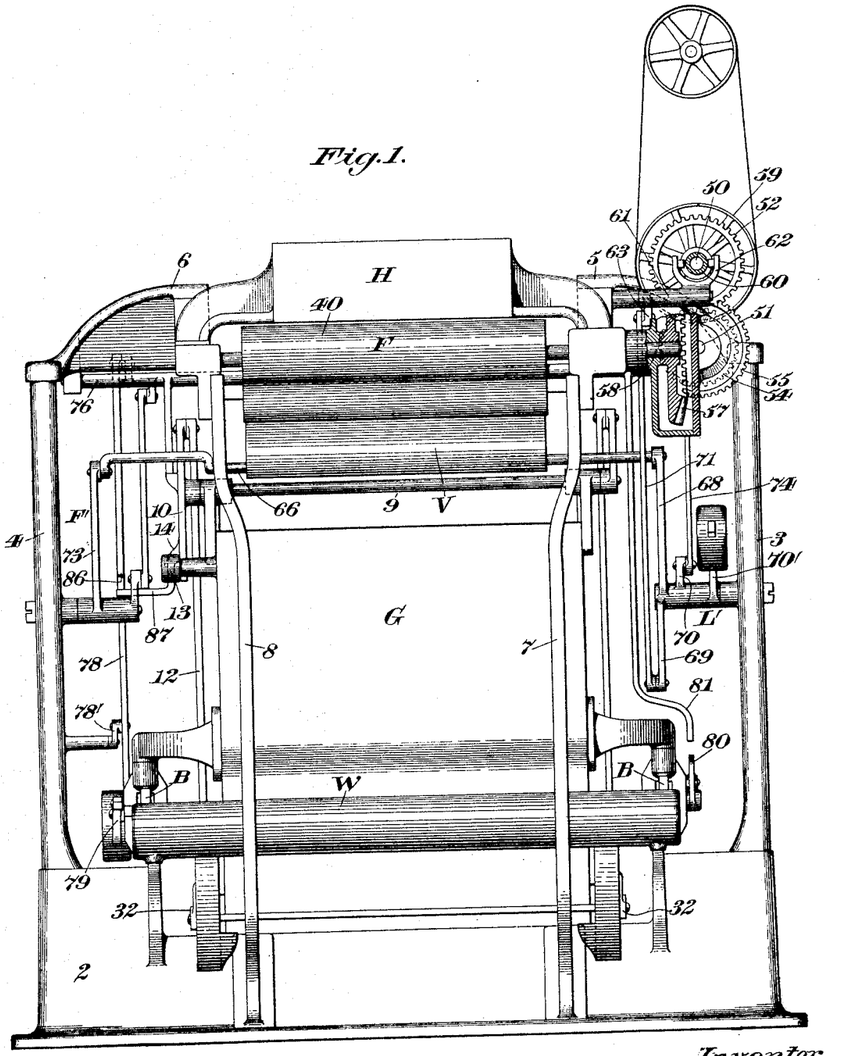
Figure 1 is a front elevation of the weighing-machine embodying my present invention, and it illustrates the positions occupied by the respective parts at the commencement of operation.

The actuator for the gear-coupler is designated by 61, and it may be carried upon the framework of the machine for rocking or oscillatory movement. Said actuator consists of an elongated sleeve, through the bore of which extends a projecting pivot on the framework, and two arms which extend therefrom at substantially right angles, one of said arms being bifurcated. The respective branches of the bifurcated arm 62 are furnished with studs or lugs, which lie in a peripheral groove or channel in the slidable coupling device 60. (See Fig. 1.) The arm 63 of the actuator 61 will be preferably connected to a suitable operating device controlled or regulated by the weighing mechanism, as will be hereinafter set forth.

It will be remembered that the feed-conveyer F has successive fast and slow speeds and an interval of rest which commences with the completion of a load, and when it is thrown out of action the mass sustained thereby adjacent to its discharge edge will ordinarily be projected into the loaded bucket, and for the purpose of catching this part of the drip-stream, which, however, is generally a very small quantity, I provide a valve, that shown being extensible, flexible, and reciprocatory below the delivery end of said feed-conveyer.

The valve for the feed-conveyer is designated by V, and it consists of a strip or apron of pliable material of suitable character, such as heavy canvas or leather, which is attached at one end to a relatively fixed part, as the plate 65, which is joined to the columns 3 and 4 near the upper ends thereof. The valve will be attached at its opposite end to a suitable reciprocatory member coöperative with the weighing mechanism, the rocking frame F', which is carried by the supporting framework of the apparatus, being shown for this purpose. The transverse member 66 of said rocking frame is provided with a curved metallic strip 67, to which said valve may be secured, as by riveting, to prevent buckling of the valve, and said valve, by reason of its lightness, possesses great rapidity of action to instantly stop the supply to the bucket at the close of the weighing operation, and it also being capable of entirely clearing itself of all adhering material, which is dislodged therefrom by the mere act of opening, which is an important feature when the machine is weighing certain classes of substances.

The rocking frame F', to which I have hereinbefore referred, includes in its construction in the form shown a counterweighted valve-actuating device or lever, which is designated by L', said lever being also operatively connected to the coupler 60 to reciprocate the latter along its shaft to thereby successively cause it to engage the two gears 52 and 53.

The lever L', which is supported by the column 3, has a series of arms radiating from its hub and which are designated, respectively, by 68, 69, and 70, and also a weight-carrying arm 70'. The arm 68 is joined to the transverse member of the rocking frame F', while the arm 69 is operatively connected, by the relatively long rod 71, to the arm 63 of the gear-coupler 60, whereby as the lever L' travels back and forth during the weighing operation the action of the coupler 60, and hence of the feed-conveyer F, can be properly governed.

Figures 5, 6:
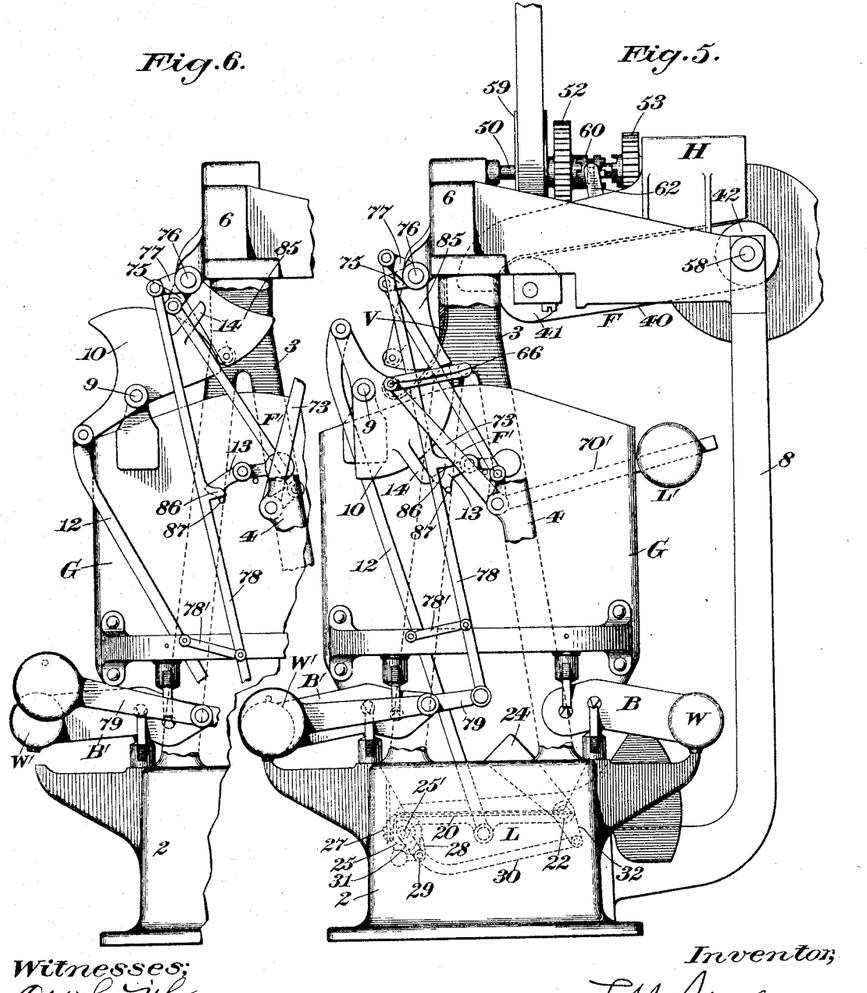
Fig. 5 is an end elevation as seen from the left in Fig. 1, the parts being in positions corresponding with said figure and with Fig. 2, and it is intended more especially to illustrate the interlocking-stop mechanism and latch-tripper.
Fig. 6 is a fragmentary view as seen from the left in Fig. 1, the interlocking-stop mechanism being shown in its other position.

The lever-arm 68 has a companion member which moves in unison therewith upon the opposite side of the machine in the form of an arm 73, Fig. 5, pivoted to the frame 4 and attached to a rearwardly-bent portion of the cross-bar 66, the purpose of said arm being, in connection with the lever-arm, to obtain an even uniform movement of the valve as it opens and closes.

The counterweighted lever L' is in the nature of a valve-closing device, so that when it drops from its highest to its lowest position it will swing the flexible valve V slowly toward and subsequently across the path of the supply-stream, such operation, however, being normally limited by the weighing mechanism.

The relatively short arm 70 of the valve-actuating lever L' is connected by a link 74 to the crank-arm 75 of the interlocking stop and latch-tripper rock-shaft 76, said shaft being similarly connected at its opposite side to the hub of the rocking arm 73. The shaft 76 is supported by the framing of the machine and is furnished with a third rearwardly-extending crank-arm 77, to which is jointed the relatively long thrust-rod 78, the free end of which bears against the shiftably-supported counterweighted lever 79 on the beam B', said rod being connected by a guide-link, as 78', or otherwise to the framing of the machine.

The counterweighted lever 79, which practically forms a part of the beam mechanism, serves to limit or check the closure of the valve V and to impart an upward thrust to the connecting-rod 78, which bears thereagainst, to force or return such valve to its normal or wide-open position to permit the passage of the supply into the bucket.

Figures 3, 8:
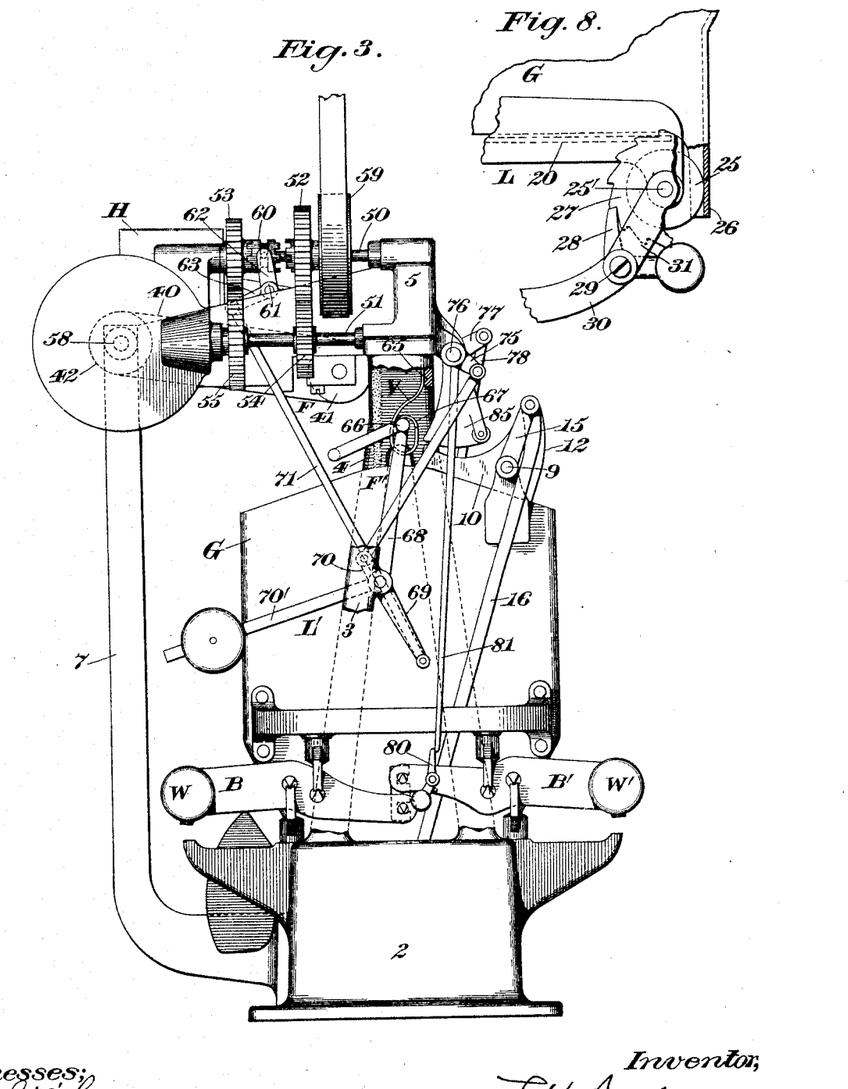
Fig. 3 is a similar view except that the feed-conveyer-driving mechanism is represented by full lines, the bucket having nearly completed its load.
Figure 4:
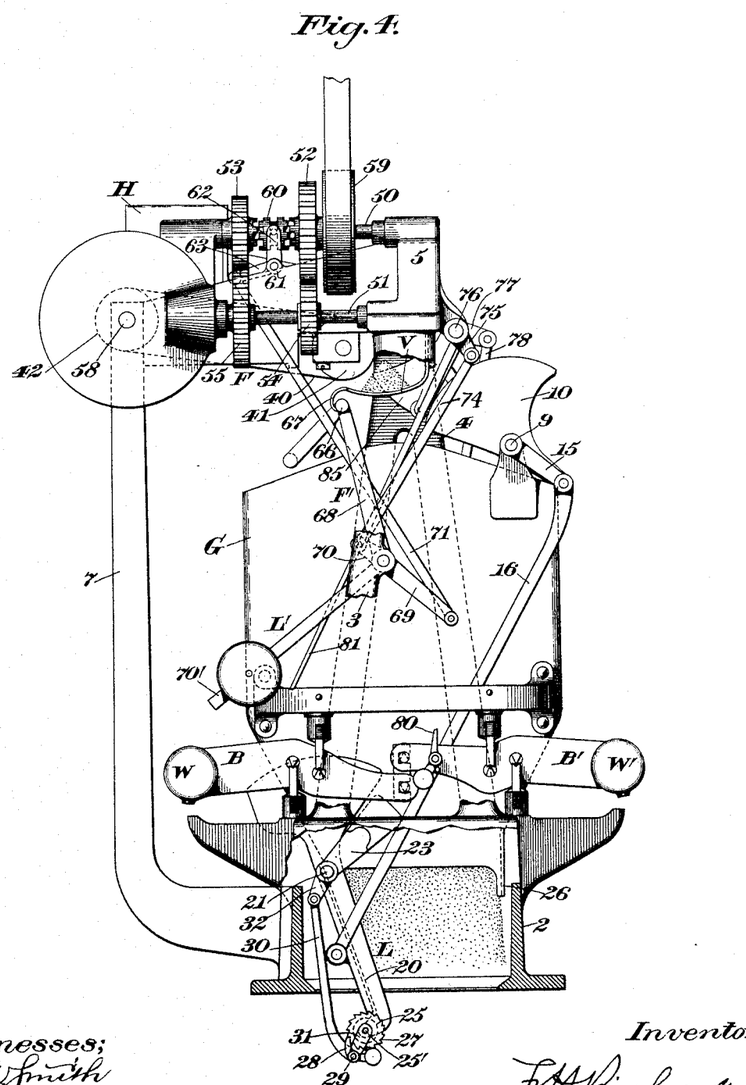
Fig. 4 is a similar view, the feed-conveyer having been stopped, the valve being closed, and the bucket being shown discharging its load.

Figs. 2, 3, and 4 represent clearly the operation of the flexible valve V, it being illustrated in its wide-open position in the first-named figure, and in its intermediate position in Fig. 3, where its progress is momentarily intercepted, and in its final or cut-off position in Fig. 4. The bucket G being empty, as represented in Fig. 2, and the valve V being wide open, the feed-conveyer F will conduct to the bucket a stream of large volume, which causes the bucket and beam mechanism to descend, and the counterweighted lever 79, moving with the beam mechanism and falling away from the rod 78, will permit the counterweighted lever L' or the weight-carrying arm 70' thereof to drop from its uppermost position, which action will swing the arm 68 and the flexible valve V to the left, such motion continuing progressively up to the commencement of the so-called "drip period," as represented in Fig. 3, at which time the valve is held against further closure, the speed of the conveyer F having been reduced at this stage to permit the delivery to the bucket of the drip-stream. On the completion of the bucket-load the valve and consequently the lever L' will be released, so that said lever will immediately fall, and in so doing it will swing the valve V bodily and quickly across the path of feed of the supply-stream for effecting the instant stoppage of the supply and without any blocking of the material whatever.

To hold the valve at the commencement of the poising period, I provide a stop which is preferably of the "by-pass" kind, it being designated by 80 and disposed in the path of movement of the oscillatory drip-rod 81, which is rigidly secured to and depends from the rock-shaft 76, coöperative with said valve. The by-pass stop 80 will be pivotally hung upon one of the arms of the beam B', it being counterweighted and having one of its arms resting against a pin or stud upon said beam.

As the counterweighted lever L' drops to effect the closure of the connected valve V the rod 81 will be swung forward, or to what is the left in the annexed drawings, by reason of the intervening connections and will be carried against the by-pass 80, which is practically a fixture on the beam on the advancing movement of the drip-rod, whereby when the by-pass stop is engaged by said rod the lever and valve may be held against further action for a brief period. At this time the drip-stream will be supplied to the bucket G, and when the load is completed thereby the beam mechanism will go below the poising-line, thereby causing the stop 80 to pass out of contact with the rod 81 to release the same, so that the lever L' may instantly drop, and in so doing it will promptly project the valve V across the path of feed of the supply-stream, the feed-conveyer F at about this time having been stopped by throwing the clutch 60 to its intermediate position.

When the lever L' is at the limit of its upstroke, as shown by Fig. 2, the coupler 60 will be in engagement with the large gear 52 on the shaft 50, so that said shaft being rotated the feed-conveyer will be driven at its maximum speed for conducting to the bucket G the main stream of the supply. As the bucket begins to fill it will descend with the beam mechanism, so that the lever is free to drop, and said lever dropping its arm 69 will swing to the right and will draw the rod 71 down and the arm 63 of the coupler 60 therewith, so that the coupler will be moved rapidly to the left, and at about the time the drip-rod 81 has abutted against the stop 80 on the beam mechanism the coupler 60 will have engaged the gear 53, as indicated in Fig. 3, so that the valve V and lever L' will be held against further action, and the gear-coupler 60 will be thereby maintained in contact with the gear 53.

On reference to Fig. 3 it will be seen that the pivots of the lever, the arm 69 thereof with the rod 71, and the rod 71 with the coupler-arm 63 are on a dead-center line, the feed-conveyer at this stage being driven at its low speed by the small gear 53, so that it will supply to the bucket the drip-stream for completing the major part of the load. When the load is completed, the bucket and the beam mechanism and the by-pass 80 will descend farther, so that the latter will pass below and release the drip-rod 81 and the operatively-connected parts, including the valve-actuating and coupler-regulating lever L', whereby the lever will instantly drop and the arm 69 will be swung to the right and elevated for a short distance. As the arm thus swings it will thrust the long rod 71 upward and will thereby move the coupler 60 out of engagement with the gear 53 and carry it to its intermediate or idle position, as indicated in Fig. 4, thereby stopping the feed-conveyer F, and during this last-mentioned movement of the lever L' the valve V will be closed by said lever in the manner previously set forth.

The shaft 76, which is coöperative and moves in synchronism with the valve, is furnished with a stop which coacts with a similar stop operable with the shiftable load-discharge member or closer of the bucket mechanism, the effective periods of said stops reciprocating or alternating. The valve-operative stop on said shaft is designated by 85, and it is in the form of a segmental blade, its function being to prevent the opening of the closer L during the load-supply period should the latch 13 be tripped too soon or fail to properly work.

The rocker 10, which constitutes part of the closer-holding means, serves as the coacting stop, it being of a similar shape to its mate and its office being to hold the flexible valve V closed while any part of the bucket-load is being discharged.

In Fig. 5 the closer-limiting stop 85 is represented occupying its effective position, the rocker or stop 10 being in contact therewith, and as the valve closes said stop 85 will be caused to travel to the right, and when the valve has reached its fully-closed position it will have bodily crossed the plane of oscillation of its mate, but during this interval should the latch 13 be tripped the stop 10 can oscillate but a very short distance, or until it meets the other, which blocks the further progress thereof and continues to do so until the stop 85 has reached the end of its working stroke, at which time it will release the stop 10, whereby the latch 13, being tripped, the closer L can be forced open by the weight of the contents within the bucket, which will thereby swing the rocker or stop 10 about its axis with its curved face contiguous to the stop 85, (see Fig. 6,) so that retractive movement of the valve-operative stop will be prevented and until the closer L reaches its normal position, when the rocker or stop 10 is again latched.

For tripping the latch 13 I provide the reciprocatory rod 78, which is operative with the valve V, with a latch-tripper 86 in the form of an extension thereon, which on the final movement of the valve will be forced rapidly downward against the projecting pin 87 on the latch 13, thereby depressing said latch and disengaging it from the rocker 10, so that the rocker, and consequently the bucket-closer L, will be freed of all restraint, and the latter can then be opened by the weight of the contents in the bucket which rest thereagainst.

As the load is discharged by the bucket the beam mechanism will instantly resume its normal position, but the counterweighted lever 79 will be maintained in its shifted position, as indicated in Fig. 6, by the rod 78, which is held from returning to its primary position by the interlocking stop 10, acting through the intervening stop 85 and the shaft 76. When, however, the closer is shut, these parts can return to their primary positions, and as the weighted lever 79 drops it will transmit an upward thrust to the connecting-rod 78, which is transferred to the valve V through the intermediate connection for opening the valve and for again starting the feed-conveyer F in motion to supply the bucket with another charge of material.

The operation of the hereinbefore-described machine, briefly, is as follows: Figs. 2 and 5 represent the positions occupied by the respective parts at the commencement of operation. The valve V is in its open position, and the closer L is shut and held in such position by the counterweighted latch 13, which is in engagement with the arm 14 of the rocker 10, and the gear-coupler 60 will be in engagement with the relatively large gear 52, so that the feed-conveyer F can be driven by virtue of the interposed mechanism at a relatively rapid rate of speed for conducting from the hopper H the major supply which is delivered to the empty bucket G. When a certain proportion of the load to be weighed has been received by the bucket, it will descend with the beam mechanism, and the counterweighted lever, which constitutes practically an integral extension of the beam B', moving with said beam and away from the rod 78, which is connected to the shaft 76, will permit the counterweighted lever L', which is also operatively connected to said shaft, to drop, so that the arm 68, with the similar arm 73, will be rocked to what is the left in Fig. 2, thereby advancing the valve V toward its closed position.

At the commencement of the poising period, as represented by Fig. 3, the drip-rod 81 on the shaft 76 will have been carried against the by-pass stop 80 on the beam B', which momentarily holds the connected parts, the gear-coupler 60 having been caused in the interval to engage the gear 53, which is operable for driving the feed-conveyer F at its low speed for supplying to the bucket the drip-stream, the several pivots of the lever L', the arm 69, and the rod 71 being on a dead-center line.

When the load is completed, the by-pass stop 80 will pass clear of the rod 81, so that the connected parts will be released, and the lever L', dropping farther, will quickly carry the valve V bodily across the line of feed of the supply and the rod 71 will be thrust upward by the lever-arm 69, whereby the gear-coupler will be carried to its ineffective or idle position between the two gears 52 and 53, as indicated in Fig. 4, to thereby wholly stop the feed-conveyer F. On the last-mentioned movement of the respective parts the reciprocatory rod 78 will be forced downward with the projection 86 thereof into contact with the latch 13, thereby tripping said latch and consequently freeing the closer L, so that the weight of the load in the bucket may force the latter open. On the opening of the closer the load will promptly gravitate therefrom, and when it has been fully discharged the closer will be shut and the remaining parts will return to their normal position. As the closer L shuts, the roll 25 will be rotated by the pawl 28 in the manner hereinbefore set forth for clearing itself and the depending lip 26 of the bucket of adhering material.

Having described my invention, I claim—

1. The combination, with weighing mechanism, of a feeder; driving mechanism for actuating said feeder; means for stopping the feeder on the completion of a load; a flexible valve; and instrumentalities controlled by the weighing mechanism, for actuating said valve on the stoppage of the feeder, whereby it is adapted to catch material passing therefrom.

2. The combination with weighing mechanism, of stream-supplying means; an extensible valve attached at one end to the framework of said weighing mechanism; and a movable actuator fixed to the opposite end of the valve and acting both to open and close the same, said actuator being controlled by the weighing mechanism.

3. The combination with weighing mechanism, of stream-supplying means; a flexible valve attached at one end to a fixed part; and a movable actuator controlled by the weighing mechanism and attached to the opposite end of said valve, said actuator acting both to open and close the valve.

4. The combination, with weighing mechanism, of stream-supplying means; a flexible valve attached at one portion to a fixed part; and a counterweighted valve-actuator connected to another portion of said valve and acting both to open and to close the same.

5. The combination with weighing mechanism, of stream-supplying means; a flexible valve attached at one end to the framework of said weighing mechanism; a counterweighted rocking frame having a member connected to the valve, to thereby close the same; and means controlled by the weighing mechanism for operating said frame and causing it to open said valve.

6. The combination with weighing mechanism, of stream-supplying means therefor including a feed-conveyer; driving mechanism for said conveyer embodying a shaft and two loose power-transmitting members; a coupling device intermediate said power-transmitting members; an oscillatory actuator controlled by the weighing mechanism and connected to said coupling device; and a flexible valve operated by said actuator.

7. The combination, with two members one of which is shiftably connected to the other for reciprocatory movement, of a wiper carried by one of said members; and means supported by the wiper-carrying member, for actuating said wiper.

8. The combination, of a bucket having a depending lip and a closer hinged to said bucket and provided with a wiping-roll at its discharge edge which is contiguous to said depending lip when the closer is shut.

9. The combination, with two members one of which is shiftably carried by the other, of a wiper between said members, and mechanism for effecting an intermittent movement of said wiper.

10. The combination, with a reciprocatory weighing-bucket having a closer shiftably connected thereto, of a wiper carried by one of said parts; and a pawl-and-ratchet mechanism for actuating said wiper.

11. The combination, with a bucket, of a closer shiftably connected thereto and having a wiping-roll mounted thereon; a ratchet carried by the shaft of the roll; and an actuating-pawl for said ratchet.

12. The combination, with a bucket, of a closer shiftably connected thereto and having a wiping-roll mounted thereon, of coöperatively-connected links one of which is loosely jointed to the shaft of said roll and the other of which is connected to the resistance member; and an actuating member for said wiping-roll, coöperative with such links.

13. The combination, with a bucket, of a closer connected thereto by means including a bracket; a roll mounted on the closer; two coöperatively-connected links jointed, respectively, to the bracket and the shaft of the roll; and an actuating device for the roll, coöperative with said links.

14. The combination, with a bucket, of a closer shiftably connected thereto for reciprocatory movement; a wiper mounted on said closer; and means for actuating said wiper on one of the strokes of the closer.

15. The combination, with a bucket, of a closer shiftably connected thereto for reciprocatory movement; a wiper mounted on said closer; and means for actuating said wiper during the shutting movement of the closer.

16. The combination, with weighing mechanism and with stream-supply means therefor comprehending a feed-conveyer; of driving mechanism for said feed-conveyer, including a shaft and two loose power-transmitting members; a coupling device intermediate said power-transmitting members; an oscillatory member operative with the weighing mechanism and having a projection; and an operative connection between said projection and the coupling device.

17. The combination, with weighing mechanism and with stream-supply means therefor comprehending a feed-conveyer; of driving mechanism for said conveyer, embodying two shafts provided with differential meshing gears two of which are loose on one of the shafts; a slidable coupling device between said loose gears located to alternately engage the same; an oscillatory member coöperative with the weighing mechanism and having a projection; and a connection between said projection and the coupling device.

18. The combination, with weighing mechanism and with stream-supply means comprehending a feed-conveyer; of driving mechanism for said feed-conveyer, including a shaft carrying two loose power-transmitting members; a coupling device intermediate said power-transmitting members and having three distinct shifts on two of which it is adapted to alternately engage the power-transmitting members and on the third to be thrown into an ineffective position; and coupling-device-actuating instrumentalities coöperative with, and controlled by, the weighing mechanism.

19. The combination, with weighing mechanism, of stream-supply means; and a valve consisting of a pliable strip of material attached at one end to a fixed part and at the other end to a member coöperative with the weighing mechanism and constituting a valve opening and closing device.

20. The combination, with weighing mechanism, of stream-supply means comprehending a feed-conveyer; feed-conveyer-driving mechanism including a shaft carrying two loose power-transmitting members; a coupling device for alternately engaging said power-transmitting members; a flexible valve and its actuating device; and an operative connection between said valve-actuating and said coupling devices.

21. The combination, with weighing mechanism and with stream-supplying means therefor, of a loosely-hanging flexible valve connected at one end to a fixed part; and a valve-actuating device attached to the other end of said valve, said actuating device being controlled by the weighing mechanism.

22. The combination, with weighing mechanism and with stream-supplying means therefor, of a loosely-hanging flexible valve connected at one end to a fixed part; and a rocking frame having a member to which the other end of said valve is attached, said rocking frame being controlled by the weighing mechanism.

23. The combination, with weighing mechanism and with stream-supply means, of a flexible valve connected to a relatively-fixed part and hanging loosely therefrom; a rocking frame provided with a metallic strip to which said valve is attached.

24. The combination, with weighing mechanism and with a feed-conveyer and its driving mechanism comprehending two loose power-transmitting members and an intermediate coupling device; of an oscillatory member having a projection; and a rod operatively connected to said oscillatory member and to the coupling device, whereby the latter will be given three distinct shifts on each stroke of said oscillatory member.

25. The combination, with two members one of which is shiftable with respect to the other for reciprocatory movement, of a rotary wiper carried by one of said members; and means supported by the wiper-carrying member, for rotating said wiper.

26. The combination, with a bucket having a discharge-outlet, of a reciprocatory closer therefor having a movable discharge edge; and means for intermittently imparting a step-by-step action to said discharge edge.

FRANCIS H. RICHARDS.

Witnesses:
    FRED. J. DOLE,
    GEO. A. HOFFMAN.